United States Patent
Bhadauria et al.

(10) Patent No.: US 11,610,143 B1
(45) Date of Patent: Mar. 21, 2023

(54) CLIENT-SPECIFIC VALIDATION FOR MIGRATING TO A VERSION OF A MACHINE LEARNING MODEL USING CLIENT-SUPPLIED TEST DATA

(71) Applicant: Amazon Technologies, Inc., Seattle, WA (US)

(72) Inventors: Vivek Bhadauria, Redmond, WA (US); Vasant Manohar, Bothell, WA (US); Anand Dhandhania, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 16/915,744

(22) Filed: Jun. 29, 2020

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| 8,001,422 | B1 | | 8/2011 | Sun et al. |
| 10,694,024 | B1 | * | 6/2020 | McDole ............... G06Q 20/305 |
| 2015/0379425 | A1 | * | 12/2015 | Dirac .................... G06N 20/00 706/12 |
| 2017/0124894 | A1 | * | 5/2017 | Essafi ..................... G06F 30/20 |
| 2018/0307979 | A1 | * | 10/2018 | Selinger .................. G06F 9/46 |
| 2020/0334616 | A1 | * | 10/2020 | Qiu ............... G06Q 10/063118 |
| 2020/0380301 | A1 | * | 12/2020 | Siracusa .................. G06F 8/34 |

\* cited by examiner

*Primary Examiner* — Thaddeus J Plecha
(74) *Attorney, Agent, or Firm* — Kowert, Hood, Munyon, Rankin & Goetzel, P.C.; Robert C. Kowert (57) ABSTRACT

A network-based service may provide a machine learning model for different clients. The network-based service may implement an interface that allows a client to identify a test data set for validating versions of the machine learning model specifically for the client. When a new version of the machine learning model is created, a validation test using the test data set identified by the client may be used. Results of the validation test may be used to make a decision regard whether to migrate workloads for the client to the new version of the machine learning model.

20 Claims, 8 Drawing Sheets

CLIENT-SPECIFIC VALIDATION FOR MIGRATING TO A VERSION OF A MACHINE LEARNING MODEL USING CLIENT-SUPPLIED TEST DATA

BACKGROUND

Machine learning can solve challenging problems in many real-world applications. The advent of virtualization technologies for commodity hardware has provided benefits with respect to managing large-scale computing resources for many customers with diverse needs, allowing various computing resources to be efficiently and securely shared by multiple customers. A provider network can utilize various machine learning systems (including e.g., machine learning models) as part of network-accessible services for multiple customers (also called tenants or subscribers), and the customers can access and use the machine learning systems through network connections to process on-demand tasks. For instance, a provider network can provide machine learning models as part of a network-accessible service to detect objects in images or scan documents to automatically extract text and data for different customers.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques to client-specific validation for migrating to a version of a machine learning model using client-supplied test data are described in this disclosure. In some embodiments, a network-based service may be a system that performs operations on behalf of various clients. In some embodiments, the network-based service may be a machine learning service or may otherwise implement machine learning models to perform the operations. As discussed below with regard to FIG. 2, a network-based service may be offered by a provider network, in some embodiments, along with various other network-accessible services including, for example, remote storage, remote database, remote computing, remote networking, and the like, for multiple clients. In some embodiments, a network-based service may be a stand-alone system or service that implements a machine learning model to perform operations.

Various types of network-based service may implement machine learning models. For example, a network-based service may implement one (or more) machine learning models to detect objects in images or scan documents to automatically extract text and data, in some embodiments. In some embodiments, a machine learning model used by a network-based service may be updated to newer versions (e.g., according to a fixed or various schedules) in order to improve, among other features, accuracy and/or efficiency. Generating newer versions of a model may include various types of a machine learning training techniques that take various kinds of input data to use for training. Because training a machine learning model used in a network-based service by a wide variety of clients may involve selecting data whose features may not be fully representative of the variety of different clients, migrating to the updated version of the machine learning model trained in such a fashion may have non-uniform on different clients, and can include scenarios where the machine learning model performance is improved overall but causes performance regression for some clients or a specific set of use cases.

In various embodiments, a network-based service may implement client-specific validation for migrating to a version of a machine learning model using client-supplied test data. In this way, migration decisions for migrating to an updated version of a machine learning model can be evaluated and made for each client on an individual basis. The network-based service may enable clients to provide validation data sets, based on which the network-based service may choose an appropriate model version for a client. For instance, the network-based service may perform a validation test on an updated version of the machine learning model for a particular client using the identified test data set, and, based on result of the validation test, make a decision regarding whether to retain the current version of the machine learning model or migrate to the updated version of the machine learning model for the particular client. In some embodiments, the network-based service may provide results of the validation test and/or a recommendation to clients. In some embodiments, the network-based service may allow clients to request migration to an updated version and in some embodiments, the network-based service may automatically migrate the client to the updated version of the machine learning model.

One skilled in the art will appreciate that the techniques disclosed herein are capable of providing technical advantages, including: (1) providing flexibility to the clients to manage their respective migration processes, (2) improving performance of the machine learning models by avoiding or mitigating feature regression for individual clients, (3) eliminating or minimizing the need to revert to old versions after migration, and (4) reducing the waste of computing resources for unsuccessful or unnecessary launch of new machine learning models.

Figure 1:
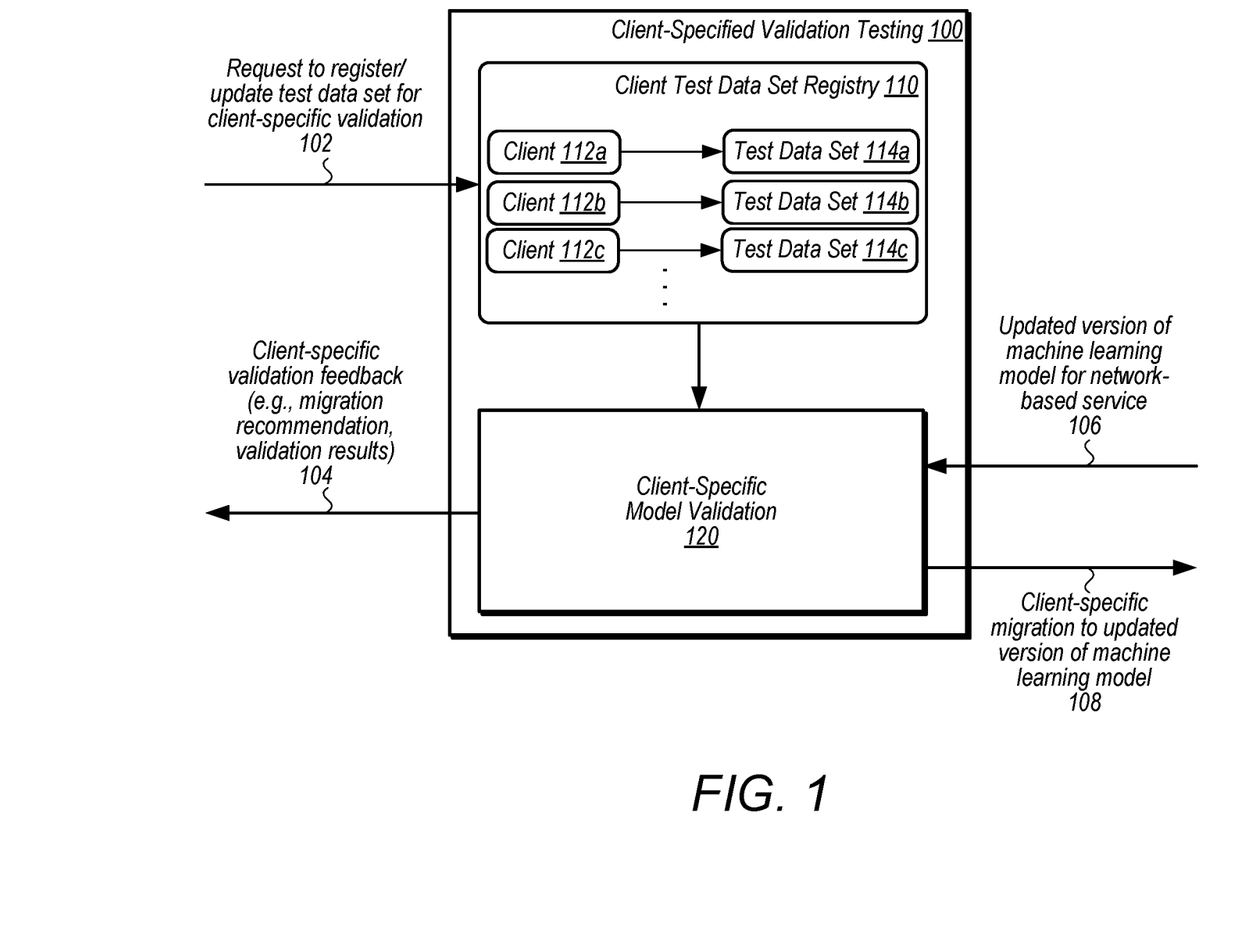
FIG. 1 is a block diagram showing client-specific validation for migrating to a version of a machine learning model using client-supplied test data, according to some embodiments.
Figure 2:
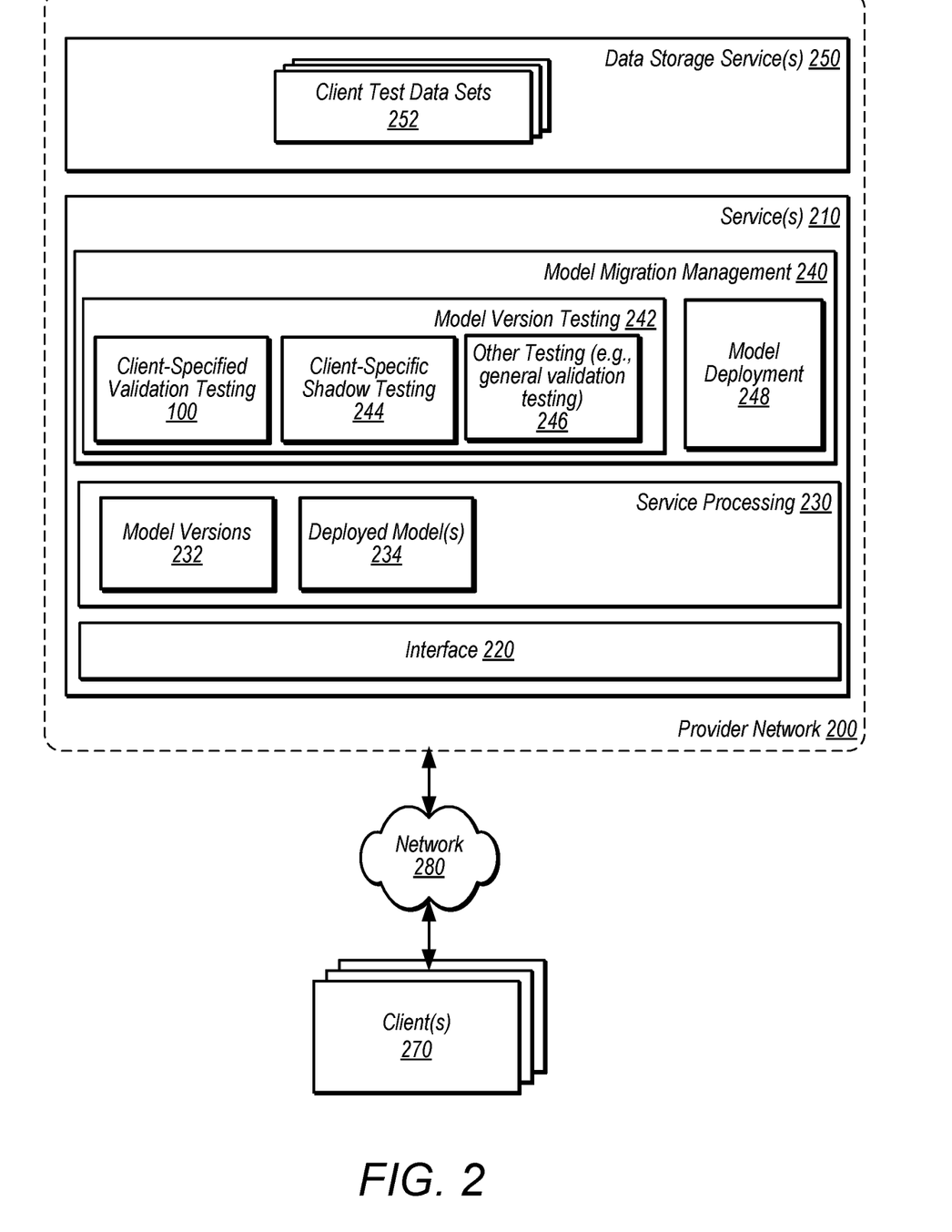
FIG. 2 is a block diagram showing an example network-based service that deploys machine learning models to perform service operations and implements client-specific validation for migrating to a version of a machine learning model, according to some embodiments.

FIG. 1 is a block diagram showing client-specific validation for migrating to a version of a machine learning model using client-supplied test data, according to some embodiments. Client-specified validation testing 100 may be implemented as part of a network-based service to make independent validations for different clients (e.g., so that different domains of data to which a machine learning model is applied can be tested), in some embodiments, as illustrated in FIG. 2. Client-specified validation testing 100 may implement a client test data set registry 110, in various embodiments. Client test data set registry 110 may store records, associations, mappings, or other identifications of different test data sets for different clients. For example, a request to register or update a test data set for client specific validation may be supported, as indicated at 102, which results in an association between the client (e.g., an association between client 112a and test data set 114a, an association between client 112b and test data set 114b, or an association between client 112c and test data set 114c) stored in client test data set registry 110. In some embodiments, request 102 may be received via an interface (e.g., a programmatic interface such as an Application Programming Interface (API), a command line interface, and/or graphical user interface).

In some embodiments, the test data set 114 may be stored in a data store that stores registry 110. In some embodiments, the test data set 114 may be stored in another storage system or location (e.g., identified by an identifier, locator, path or other access information which can allow for the test data set to be obtained by client-specified validation testing 100), as depicted in FIG. 2. Test data sets 114 may various types of documents, files, schemas, mappings, input and result sets, or any other information which can be used to test the application of an updated version of a machine learning model and measure performance of the updated version of the machine learning model. In some embodiments, registered test data sets may also be updated for clients (as also indicated at 102) in order to allow for test data sets to be replaced, modified, added, removed, or otherwise changed from a prior test data set (e.g., to add a test data scenario for a new feature implemented by a client application).

In various embodiments, client-specific model validation 120 may be implemented as part of client-specified validation testing 100. For example, client specific model validation 120 may perform validation testing, individual for different clients 112 in order to determine validation results using the test data set 114 provided by the different clients an updated version 106 of a machine learning model for a network-based service. The test data set for a client may be obtained (e.g., by accessing client test data set registry 110) and the processed using the updated version of the machine learning model. For example, client-specific model validation 120 may feed, input, request, or otherwise cause a network-based service to perform one or more service operations (e.g., as would normally be invoked on behalf of the client) that apply the updated version 106 of the machine learning model using the test data set as input data. The results generated by the application of the updated version 106 of the model may be measured against a correct set (e.g., a labeled set or other answer set). For instance, a text extraction operation may apply an updated version of a text recognition model to one or more documents in a test data set for a client and the resulting accuracy of the extracted text may be compared with a correct extraction to determine one (or more) performance metrics with respect to text extraction (e.g., missing words, misspelled words, correct words, etc.).

Client-specific validation feedback 104 may be provided to a client, in various embodiments. For example, a migration recommendation (e.g., a decision made by client-specific model validation 120 about whether (or not) to migrate to the updated version of the model). As discussed below with regard to FIG. 4, a migration recommendation may allow for a client to choose when (and/or if) migration happens (e.g., whether or not a migration is recommended). In some embodiments, validation feedback 104 may provide the raw validation results (e.g., the one or more performance metrics, the output of the application of the updated version of the model, or various other descriptions of the updated version of the machine learning model's performance that can be used to validate whether it is improving or regressing on performance). In some embodiments, a history of model performance over multiple versions including the updated version may be provided as client-specific validation feedback 104. In some embodiments, client-specific model validation 120 may provide feedback in accordance with validation configuration information specified as part of a request 102 registering a test data set or another request to configure validation performance. For example, automatic migration, the number and/or type of performance metrics, criteria for performing migration or refraining from migration (e.g., less than or equal to 80% accurate, then do not migrate) may be configured as part of validation performance. In some embodiments, validation feedback 104 may be provided via an interface (e.g., a programmatic interface such as an Application Programming Interface (API), a command line interface, and/or graphical user interface).

In various embodiments, client-specific model validation may direct, request, or otherwise cause client-specific migration to the updated version of the machine learning model, as indicated at 108. For example, client-specific model validation 120 may make a decision regarding whether to perform migration to the updated version (e.g., using automatic migration criteria or as a migration recommendation using performance metrics). If the decision is to migrate to the updated version (e.g., automatically and/or in response to a confirmation to migrate received from a client), then various requests, commands, or other instructions may be sent (e.g., to a deployment system like model deployment 248 in FIGS. 2-5).

FIG. 2 is a block diagram showing an example network-based service that deploys machine learning models to perform service operations and implements client-specific validation for migrating to a version of a machine learning model, according to some embodiments. In FIG. 2, provider network 200 may be a private or closed system or may be set up by an entity such as a company or a public sector organization to provide one or more services (such as various types of cloud-based storage) accessible via the Internet and/or other networks to one or more client(s) 270. Provider network 200 may be implemented in a single location or may include numerous data centers hosting various resource pools, such as collections of physical and/or virtualized computer servers, storage devices, networking equipment and the like (e.g., computing system 800 described below with regard to FIG. 8), needed to implement and distribute the infrastructure and storage services offered by provider network 200. In some embodiments, provider network 200 may implement various computing resources or services, such as a data storage service(s) 250 (e.g., object storage services, block-based storage services, or data warehouse storage services), service(s) 210 that implement machine learning model(s) for which client-specific validation testing may be implemented, as well as other service(s), which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated) that may not implement machine learning models.

In at least some embodiments, client test data sets 252 for one or multiple different clients may be stored in data storage service(s) 250, which can be accessed by model version testing 242, as discussed below. Data storage service(s) 250 may implement different types of data stores for storing, accessing, and managing data on behalf of client(s) 270 as a network-based service that enables one or more client(s) 270 to operate a data storage system in a cloud or network computing environment. For example, data storage service(s) 250 may include various types of database storage services (both relational and non-relational) or data warehouses for storing, querying, and updating data. Such services may be enterprise-class database systems that are scalable and extensible. Queries may be directed to a database or data warehouse in data storage service(s) 250 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 250 may also include various kinds of object or file data stores for putting, updating, and getting data objects or files, which may include data files of unknown file type. Such data storage service(s) 250 may be accessed via programmatic interfaces (e.g., APIs) or graphical user interfaces. Data storage service(s) 250 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, service(s) 210 may be provided by provider network 200 for client(s) 270 that utilize one (or more) machine learning model(s) to support various operations, such as different model versions 232 and deployed model(s) 234. In some embodiments, service(s) 210 may deploy machine learning model(s) 234 to process various tasks for client(s) 270 (or clients internal to provider network 200). For instance, deployed machine learning model(s) 234 may include a document scanning model, an image processing model, a speech recognition model, a reinforcement learning model, and the like. In some embodiments, client(s) 270 of service(s) 210 may include clients from different domains. For instance, a document scanning model 234 may be accessed by client(s) 270, e.g., through network 280, to scan documents from different domains (including e.g., legal documents, financial documents, medical documents, etc.). In some embodiments, service(s) 210 may maintain machine learning model(s) 234 behinds the scenes and continuously create updated version(s). To avoid feature regression to client(s) 270, as described above, service(s) 210 may perform client-specific migration system(s) to choose appropriate version(s) of machine learning model(s) 234 for individual client(s) 270, according to some embodiments. In some embodiments, the client-specific migration system(s) may notify client(s) 270 upon availability of an updated version of machine learning model(s) 234 and, based at least in part on respective response from individual client(s) 270, migrate machine learning model(s) 234 to the updated version at specific points in time.

Generally speaking, client(s) 270 may encompass any type of client configurable to submit network-based requests to provider network 200 via network 280, including requests for storage services (e.g., a request to create, read, write, obtain, or modify data in data storage service(s) 250, a request to register a test data set for validating versions of machine learning models applied by service(s) 210, a request to invoke operations performed by service(s) 210, such as a request to perform object detection or text extraction using a machine learning model (or models), and so on). For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of storage resources in data storage service(s) 250 to store and/or access the data to implement various applications and/or. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network 200. In some embodiments, client(s) 270 may be configured to generate network-based services requests according to a Representational State Transfer (REST)-style network-based services architecture, a document- or message-based network-based services architecture, or another suitable network-based services architecture.

In various embodiments, network 280 may encompass any suitable combination of networking hardware and protocols necessary to establish network-based-based communications between client(s) 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, client(s) 270 may communicate with provider network 200 using a private network rather than the public Internet.

In some embodiments, service(s) 210 may include interface 220 to facilitate communications with clients 270. Interface 220 may include, e.g., a console, a graphic user interface, a command line interface (CLI), and/or an application program interface (API). For instance, interface 220 may include one or more API's which may invoke operations that cause the application of a machine learning model 234 that is deployed for performing the operations. As discussed above with regard to FIG. 1, interface 220 may support requests to model migration management 240 to, among other requests, register and/or update a test data set for a client. In some embodiments, different types of testing modes may be supported (as discussed below) and client requests may be received via interface 220 to identify a testing mode to be applied for requests associated with the client.

In some embodiments, service(s) 210 may provide access to or otherwise using deployed machine learning model(s) 234 to process various tasks for different clients as part of service processing 230. For instance, deployed machine learning model(s) 234 may include an image process model to automatically detect objects in images (e.g., submitted by clients 270) and/or a document processing model to automatically scan documents (e.g., submitted by clients 270) to extract text and data. In some embodiments, clients 270 may include customers from different domains. For instance, the documents to be scanned by deployed machine learning model 234 may come from various technical areas and/or for different applications, e.g., financial, legal, medical, and the like. In some embodiments, deployed machine learning model(s) 234 may be maintained and improved behind the scenes, without exposure to clients 270, by service(s) 210. For instance, service(s) 210 may use a training system to train generate a new version of a deployed machine learning model 234, adjust the parameters of the model 234 with new data to create one or multiple versions of machine learning models 232, (e.g., machine learning (ML) model versions x.0, y.0, . . . , z.0). In some embodiments, the update of machine learning model(s) 234 may be performed according to a fixed schedule (e.g., once every 6 months) or a variable timetable (e.g., until a certain number of parameters are adjusted compared to the last version) or as part of feature additions or releases for service(s) 210. In some embodiments, the various versions 232 of machine learning models may be stored at one or more storage resources, e.g., an in-service model repository, which may be implemented as part of service(s) 210 or a storage service 250 of provider network 200 (not illustrated).

In some embodiments, upon creation of an updated version of a deployed machine learning model 234, model migration management 240 may determine various types of responsive actions for different clients (as may be specified by various migration configuration requests, such as validation test data set registration, validation testing mode selection, etc.). In some embodiments, model migration management 240 may provide notifications to respective clients 270 to indicate availability of the updated version. Note that the "current" versions of a deployed machine learning model 234 for individual clients 270 may be different, whilst the (latest) updated version may be identical, in some embodiments. For instance, at a given point in time, different clients 270 may individually use different versions of deployed machine learning model 234, but there may be still one single (latest) updated version at machine learning service 105. For instance, at a current moment, client 1 may be using version 5.0 of machine learning model 150, client 2 may be employing version 5.0, whilst client n may be utilizing version 4.0, although there may be only one updated version of a deployed machine learning model 234 which is version 6.0.

Model migration management 240 may implement various types of model version testing 242, which may be used to determine whether model deployment 248 is used to migrate a client from version of a machine learning model to the updated version, in some embodiments. For example, in some embodiments, client(s) 270 may send requests to configured, indicate and/or otherwise specific a mode or type of model version testing that may be applied, such as client-specified validation testing 100 (discussed above with regard to FIG. 1), client-specific shadow testing 244, other testing 246 (e.g., relying upon a general test data set), and/or no-testing (e.g., automatically migrating to a latest released or created machine learning model).

Figure 7:
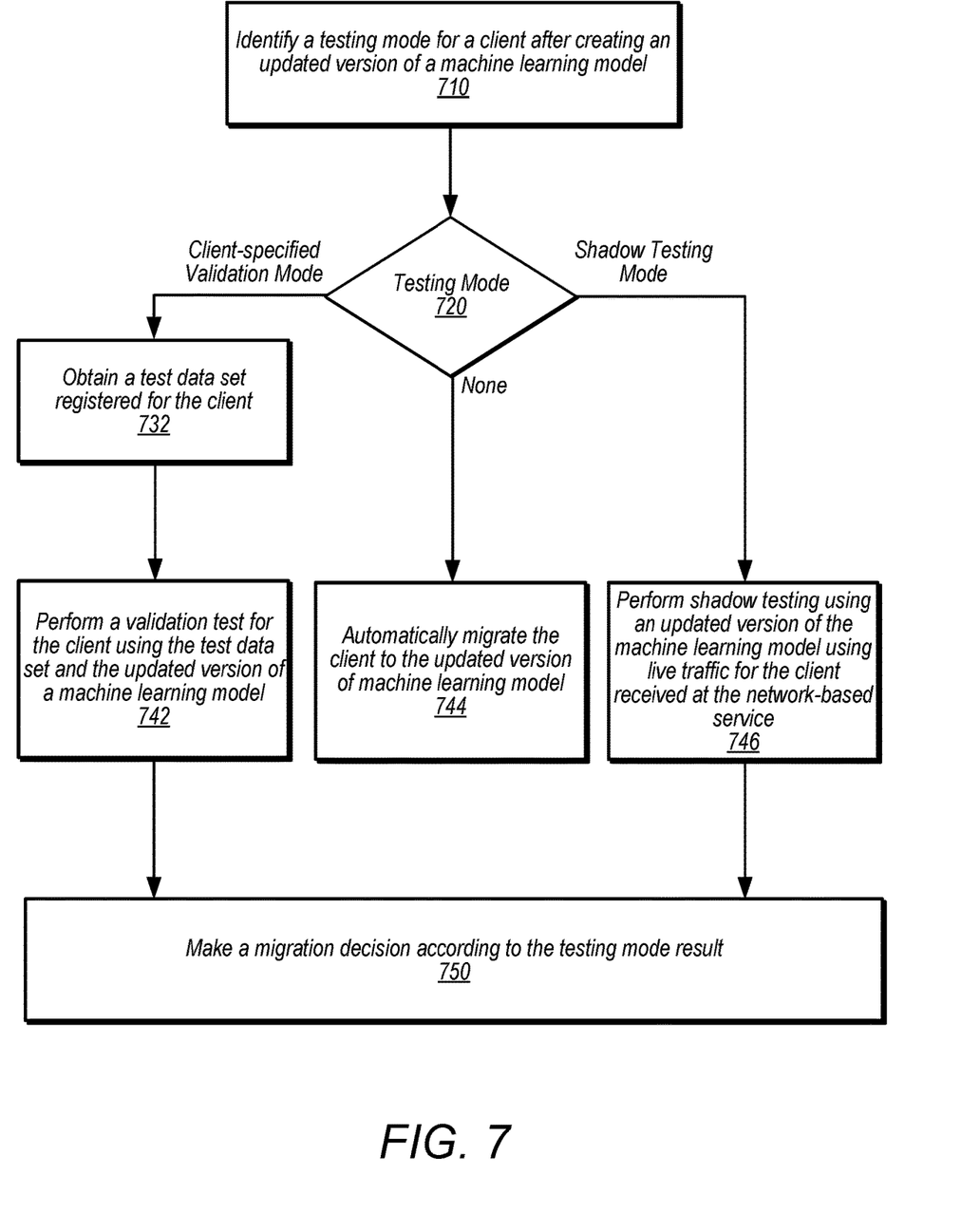
FIG. 7 is a flowchart showing different testing modes for migrating to a version of a machine learning model, according to some embodiments.

As discussed below with regard to FIG. 7, different types of testing may be handled differently. For example client-specified validation testing 100 may use client-supplied test data sets to perform a validation test and make a decision regarding whether to migrate to an updated version of a model for a client. Thus, the testing for different clients may be different, depending on the nature of the respective testing requests and/or test data sets, in some embodiments. In some embodiments, the test data sets, provided by clients 270, e.g., through network connections 280 and interface 20, to service(s) 201, may be stored at one or more storage resources, e.g., data store 120, which may be implemented as part of machine learning service 105 or a storage service of provider network 110. In some embodiments, the test data set(s) stored at data storage service(s) 250 as client test data sets 252. In some embodiments, test data sets for one client may be isolated from the test data set(s) for another client. This may improve the data security because one client may only have access to the client-provided test data set(s) at service(s) 210. In some embodiments, the test data set(s) for a particular client may be stored temporarily, e.g., until migration to the updated version for the particular client, or permanently until being deleted by the particular client.

In some embodiments, client-specific shadow testing 244 may be implemented as part of model version testing. Client-specific shadow testing 244 may be implemented using client-provided test data sets (or on live traffic for the client, such as service requests associated with the client (e.g., using or associated with a same account identifier or directed to a same object)). The updated version of deployed machine learning model 234 may be tested, using the test data set, together with the current version that a particular client is using, and results from the two versions may be compared with each other to evaluate performance of the updated version of deployed machine learning model 234. Because the current version may presently be used by the particular client 110, it may be assumed that performance of the current version may be acceptable for this particular client. Therefore, the result from the current version may be used as a benchmark for evaluating performance of the updated version. An measure or other indication of discrepancy (or other difference) between the results from the two machine learning model versions may be used to detect whether or not the updated version causes feature regression for the particular client 110.

For instance, at a current moment, client 1 may be using version 5.0 of deployed machine learning model 234, and an updated version (e.g., version 6.0) may also be created. If client-specific shadow testing 244 were specified for client 1 110(1), model version testing 242 may test both versions 5.0 and 6.0 of deployed machine learning model 234 to, for instance, detect objects from image(s) (e.g., from the test data set(s)) for client 1 or from live traffic). Model version testing 242 may then compare the result from version 6.0 with the result from version 5.0 to detect the discrepancy. For instance, model version testing 242 may compare the numbers of objects detected respectively by versions 5.0 and 6.0, or calculate a cross-entropy between the predicted probability distribution associated with the object detection by versions 5.0 and 6.0. When version 6.0 detects an equal or larger number of object than version 5.0 or the cross-entropy is less than a threshold, model version testing 242 may determine that a result of the shadow testing determines that version 6.0 satisfies criteria for migrating to the updated version. Conversely, when version 6.0 identifies less objects than version 5.0 or the cross-entropy is beyond a threshold, model version testing 242 may determine that feature regression is detected with version 6.0 for the particular client.

In some embodiments, model version testing 242 may make migration decisions for different clients with regard to migrating to an updated version of a machine learning model. For example, as discussed below with regard to FIG. 5, migration system 135 may automatically migrate machine learning model 150 to the updated version for a particular client 110. Once migrated, from then on, the updated version of machine learning model 150 may replace the old version and become available to process further input data from the particular client.

In some embodiments, model version testing 242 may make a decision to not migrate (e.g., at least not to auto-matically migrate) to the updated version for the particular client. For example, as discussed below with regard to FIGS. 3 and 4, model migration management 240 may refrain from automatically migrating to an updated version of a deployed machine learning model 234, and may provide validation results (e.g., one or more metrics associated with the testing of the updated version) and/or a migration recommendation (e.g., of the migration decision). The validation results may allow clients 270 to perform other evaluations. For instance, a particular client may download the updated version to a local machine to conduct further testing of the model. In another example, the results may indicate that performance of the updated version regresses on some index but improves on another. For instance, the results may show that the updated version detects fewer objects but completes the detection in a much shorter time. Providing validation results in this way may allow the particular client to determine the tradeoff between detection accuracy with detection speed.

In some embodiments, clients 270 can request migration to an updated version. For instance, a particular client may determine that the extent of accuracy deterioration by the updated version is acceptable because the detection speed is more important to this particular client. The particular client may thus send a request to model migration management 240 (e.g., via interface 220) to migrate to the updated version, though model migration management may make a migration decision to refrain migrating (e.g., to not automatically migrate the model to the updated version for the particular client). In response to the request to migrate, model migration management 240 may implement model deployment 248 which handles deploying an updated version of the model for the client. In some embodiments, model migration management 240 may delay (e.g., for a specified period of time) performing the migration. For example, if validation results and/or a migration recommendation are provided to client and model migration management 240 does not receive any further response from a particular client upon expiration of the time period, model migration management may perform the migration to the updated version for the client by default. In some embodiments, model migration management 240 may not necessarily wait for the further response and migrate to the updated version of deployed machine learning model 234 for the client upon expiration of the delay window.

In some embodiments, model migration management 240 may create and maintain a migration record for individual clients, according to some embodiments. For instance, at a given point in time, model migration management 240 may store a migration record, which may indicate that model migration management 240 determined to migrate a deployed machine learning model 232 from version 5.0 to version 6.0 for client 1, remain on version 5.0 for client 2, . . . , and migrate from version 4.0 to version 6.0 for client n.

In some embodiments, model migration management 240 may include model deployment 240 perform migration between versions of deployed machine learning models 234 for clients. In some embodiments, model deployment 248 may use instructions, requests, or other commands (e.g., which may include individual migration records or corresponding clients), which may further add or release resources for migrating to the updated version in service processing 230. For instance, model migration management 240 may determine resource requirements for the updated version. When more resources are needed, model migration management 240 may identify the resources, configure and launch the resources for the corresponding clients in service processing 230. Conversely, when it is determined that less resources are required for launching the updated version, model migration management 240 may release the unneeded resources in service processing 230.

In some embodiments, service(s) 210 that implement machine learning models, such as deployed model(s) 234, may implement various privacy or other permissions-based controls for performing feature extraction or other data analysis as part of the service. Extraction of some (or all) features may, for instance, be restricted from the data without first determining that a client's permission (e.g., a customer opt-in) has been granted. In this way, the service may allow for a client to control the types of analysis that are performed. For example, received image files may be marked, flagged, or otherwise indicate permissions for the kinds of analysis to be performed. In this way, client applications that rely upon the service can specify the types of analyses that are (or are not) to be performed, in some embodiments. Moreover, such applications can provide a guarantee to clients of the types of analysis that will (or will) not be performed.

Figure 3:
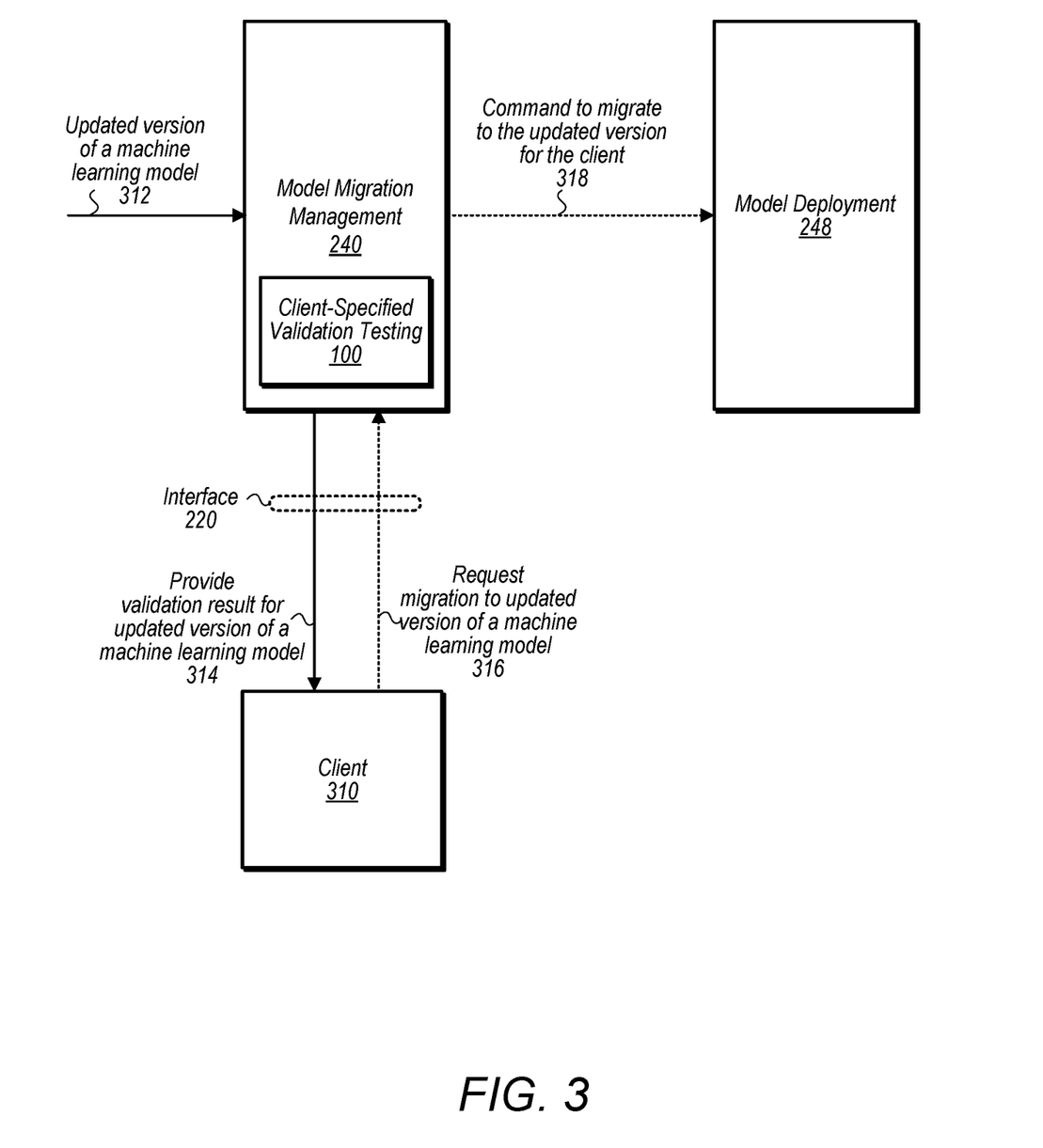
FIG. 3 is a block diagram showing example interactions to provide a validation result for an updated version of a machine learning model to a client, according to some embodiments.

FIG. 3 is a block diagram showing example interactions to provide a validation result for an updated version of a machine learning model to a client, according to some embodiments. For some clients, such as client 310, model migration management 240 may receive an updated version 312 of a machine learning model for consideration for clients, including client 310. Client-specified validation testing 100 may be performed using a test data set identified by client 310 (e.g., using a registration request discussed above with regard to FIG. 1 or other request discussed below with regard to FIG. 6), in some embodiments.

As discussed above with regard to FIG. 1, different types of validation feedback may be provided. One such example is a validation result, in some embodiments. For example, as indicated at 314, model migration management 240 may provide a validation result for the updated version of a machine learning model to client 310. In this way, client 310 can analyze the validation results in order to make determinations such as whether (or not) the updated version of the model's performance is comparable (if not the same) as a current version for the client. In some embodiments, as indicated at 316, client may request migration to the updated version of the machine learning model via interface 220. Such a request may be counter to a model migration management (e.g., a decision to not migrate to the updated version for the client), in some scenarios. Model migration management 240 may, in response, send command 318 to migrate to the updated version for the client to model deployment 248, which may perform the migration.

Figure 4:
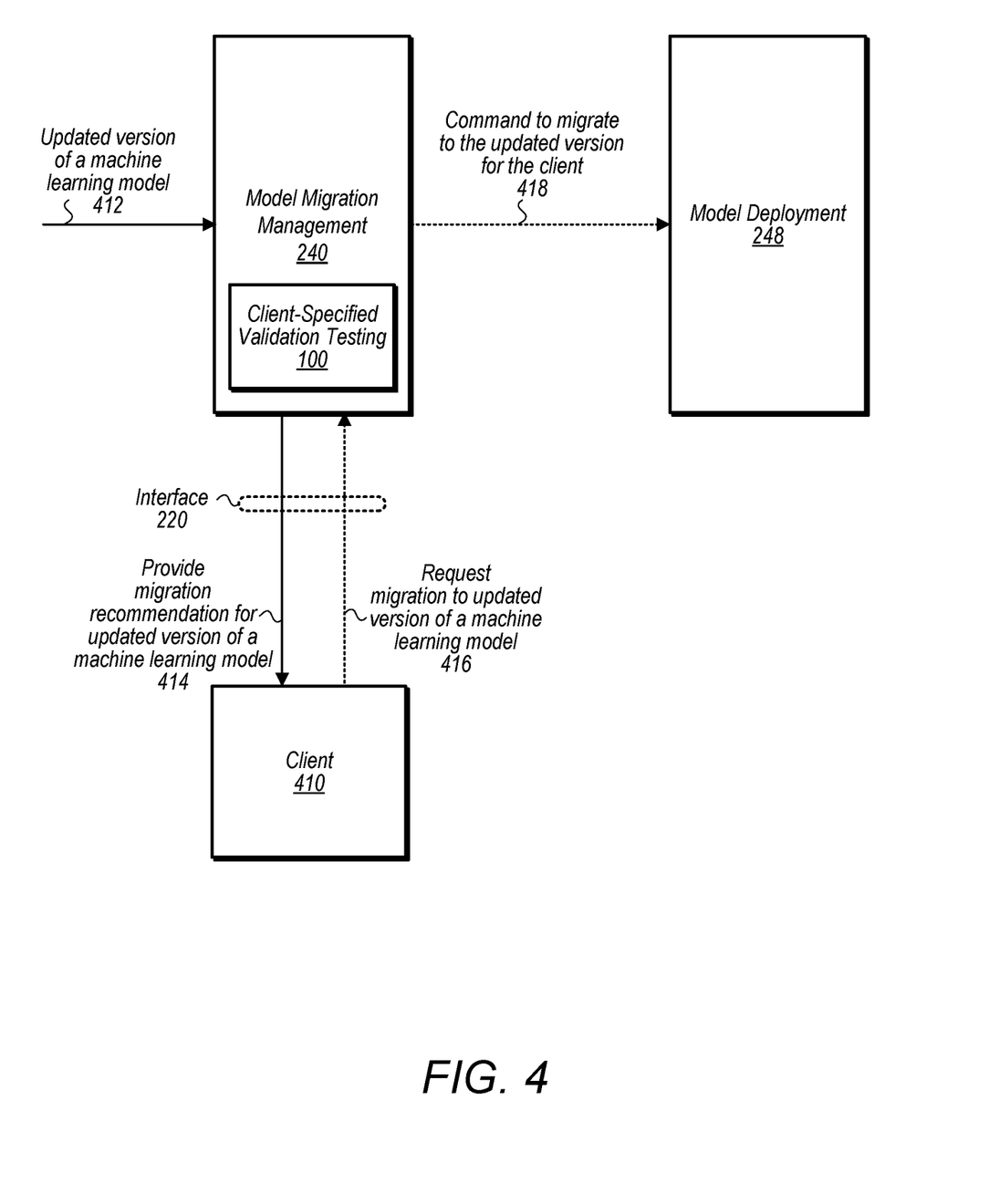
FIG. 4 is a block diagram showing example interactions to provide a migration recommendation for an updated version of a machine learning model to a client, according to some embodiments.

FIG. 4 is a block diagram showing example interactions to provide a migration recommendation for an updated version of a machine learning model to a client, according to some embodiments. Similar to FIG. 3 above, for some clients, such as client 410, model migration management 240 may receive an updated version 412 of a machine learning model for consideration for clients, including client 410. Client-specified validation testing 100 may be performed using a test data set identified by client 410 (e.g., using a registration request discussed above with regard to FIG. 1 or other request discussed below with regard to FIG. 6), in some embodiments.

As discussed above with regard to FIG. 1, different types of validation feedback may be provided. One such example is a validation result, in some embodiments. For example, as indicated at 414, model migration management 240 may provide a migration recommendation for the updated version of a machine learning model to client 410. Migration recommendation 410 may be the migration decision made by client-specified validation testing, in some embodiments. For example, it may be a migration recommendation to migrate to the updated version (even though model migration management 240 did not perform automatic migration). In some embodiments, recommendations to migrate that are not automatically performed may be made when automatic migration is not permitted by client 410 or when a confidence value for the recommendation is below a threshold amount. By providing a migration recommendation, client 410 can still be able to expressly permit (or not permit) the migration, providing version control for the machine learning model for client 410. In some embodiments, as indicated at 416, client 410 may request migration to the updated version of the machine learning model via interface 220. Model migration management 240 may, in response, send command 418 to migrate to the updated version for the client to model deployment 248, which may perform the migration.

Figure 5:
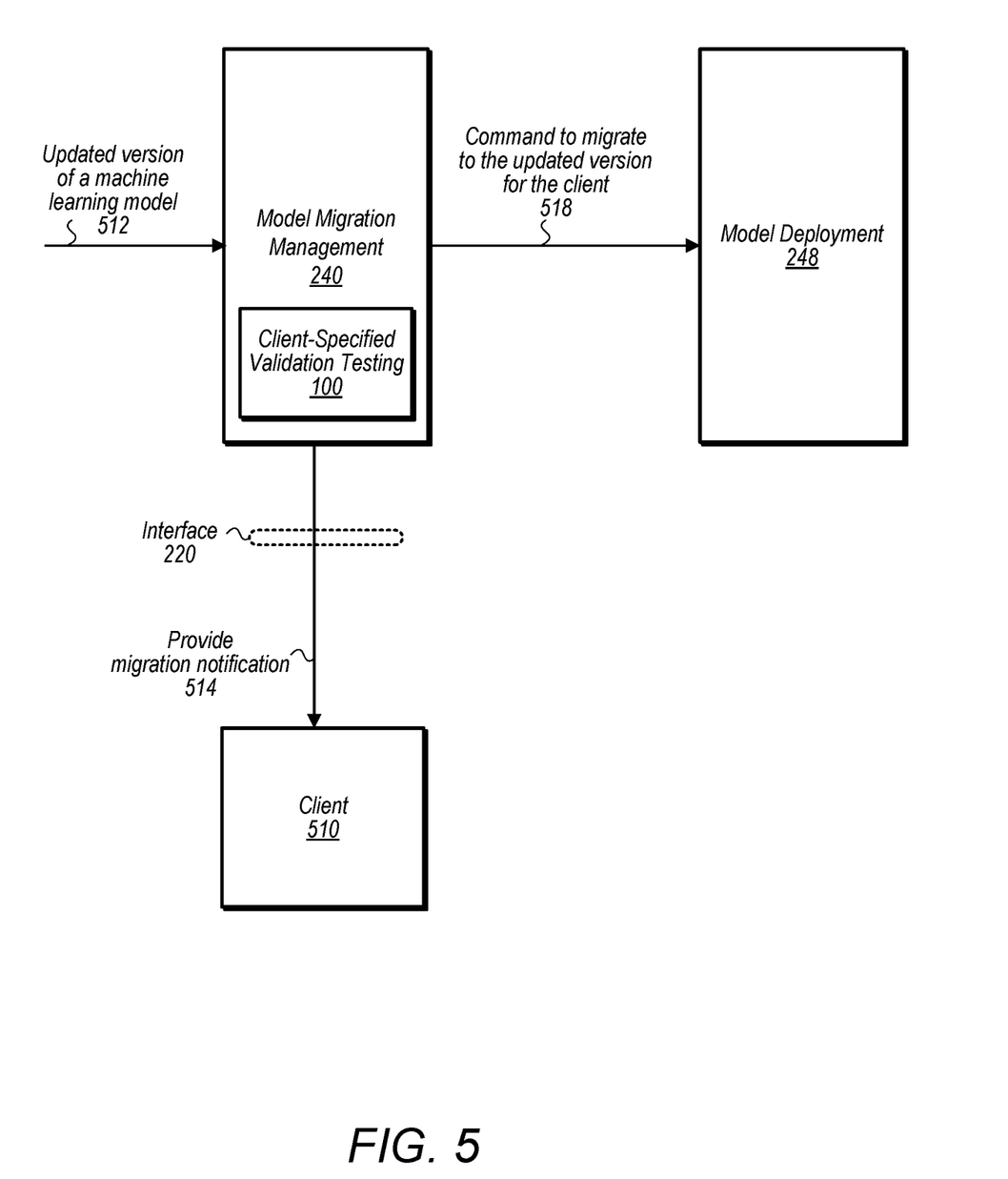
FIG. 5 is a block diagram showing example interactions to provide a notification of an automatic migration to an updated version of a machine learning model to a client, according to some embodiments.

FIG. 5 is a block diagram showing example interactions to provide a notification of an automatic migration to an updated version of a machine learning model to a client, according to some embodiments. Similar to FIGS. 3 and 4 discussed above, for some clients, such as client 510, model migration management 240 may receive an updated version 512 of a machine learning model for consideration for clients, including client 510. Client-specified validation testing 100 may be performed using a test data set identified by client 510 (e.g., using a registration request discussed above with regard to FIG. 1 or other request discussed below with regard to FIG. 6), in some embodiments.

A result of the validation test for the client may be evaluated to determine that migration to the updated version of the machine learning model should be automatically performed for client 510, in some embodiments. For example, migration criteria may be satisfied by the validation result that was specified by client 510. In some embodiments, an indication of no regression or improvement may also trigger automatic migration (even if not specified by client 510). Model migration management may command 518 model deployment 248 to migrate to the updated version for the client, in such scenarios. However, as indicated at 514, a notification of the migration may also be provided to client 510 via interface 220. For example, a version number or other identifier for the new model to be included in, for instance, requests to the service for the client may be provided. In some embodiments, notification of the updated version of the machine learning model may be provided in response to a request for the client (e.g., a request that causes application of the updated version of the machine learning model) that identifies the new version number for the model (e.g., as part of an API response for the request).

Figure 6:
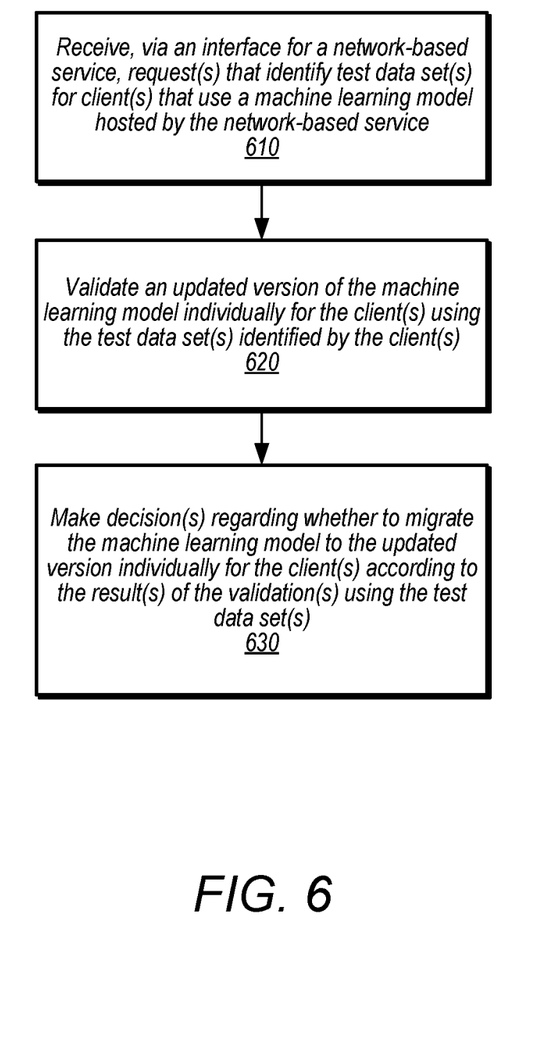
FIG. 6 is a flowchart showing client-specific validation for migrating to a version of a machine learning model using client-supplied test data, according to some embodiments.

The examples of a network-based service that client-specific validation for migrating to a version of a machine learning model using client-supplied test data as discussed in FIGS. 2-5 above have been given in regard to an example network-based service offered by a provider network. However, various other types of services (e.g., stand-alone or private) can advantageously implement client-specific validation for migrating to a version of a machine learning model using client-supplied test data, in other embodiments. FIG. 6 is a flowchart showing client-specific validation for migrating to a version of a machine learning model using client-supplied test data, according to some embodiments. These techniques, as well as the techniques discussed with regard to FIG. 7, may be implemented using components or systems as described above with regard to FIGS. 2-5, as well as other types systems, and thus the following discussion is not intended to be limiting as to the other types of systems that may implement the described techniques.

As described above, a machine learning model may be implemented as part of a network-based service to perform various tasks for multiple clients that use the machine learning model. In some embodiments, the multiple clients may represent different types of applications (e.g., customers, groups, associations, or entities) from different domains (e.g., different types of data, such as different types of image data, different types of document data, etc.). In some embodiments, the machine learning model may be maintained and updated (periodically according to a fixed schedule and/or aperiodically per a various timetable) by owners, operators, or developers for the network-based service which may introduce an updated version to support new features and/or improve machine learning model performance. As creation of the updated machine learning model may be performed with a generalized or other non-client specific data set, different performance impacts of on different clients may be incurred.

As indicated at 610, a request(s) may be received via the interface for a network-based service that identify test data set(s) for client(s) that use a machine learning model hosted by the network-based service, in some embodiments. For example, as discussed above with regard to FIG. 1, different clients may provide different test data sets (e.g., which may provide test data specific to each client's domain). The requests may include, specify or describe the test data sets (e.g., by using a REST style API that formats the data sets as a JSON or other type of object) and/or may identify a location for accessing the test data sets, in some embodiments (e.g., in a separate storage location, like a separate storage service via an object or location identifier for the test data sets). The request(s) may also specify various configuration information for perform validation using the specified test data sets (e.g., criteria for performing automatic migration, specifying results or other notifications to provide to a client, performance measures to determine or return, etc.). The interface may be one of various kinds of interfaces for the network-based service, such as a programmatic interface, command line interface, and/or GUI, in some embodiments.

An updated version of the machine learning model may be created, in various embodiments (e.g., for the various reasons discussed above). As indicated at 620, the updated version of the machine learning model may be individually validated for the client(s) using the test data set(s) identified by the client(s), in some embodiments. For example, a model migration management system (e.g., model migration management 240 in FIG. 2 above) may perform different respective validation tests for each client using the data set specifically identified by each client in order to perform the validation. As noted above, each validation may be configured according to configuration information provided by the client (e.g., in a request to register the data set or in one or more separate requests). In some embodiments, a data set identified by a client may be changed before a validation (e.g., a data set used to validate a previous version of the machine learning model may be updated by a client according to another request prior to performing another validation for another version of the machine learning model).

In various embodiments, performance of validation may include determining one or more performance measures of the updated version of the machine learning model with respect to the test data set for a client. An accuracy measurement (e.g., by comparing model-determined results with a provided answer set) may, for instance, indicate whether a positive or negative change in model performance is detected. If, for instance, a current version of the machine learning model provide 80% accuracy on the test data set and the updated version of the machine learning model provides 82%, then the respective accuracy measurements can be evaluated to determine whether performance (e.g., accuracy) is improved or regresses.

As indicated at 630, decision(s) regarding whether to migrate the machine learning model to the updated version may be individually made for the client(s) according to the result(s) of the validation(s) using the test data set(s), in some embodiments. For example, the validation results for different clients may differ as the validation test data sets may be different. One client may, for instance, have validation results that indicate no (or an acceptable amount) of regression. Another client may have noticeable performance changes in, for instance, accuracy with respect to one or more portions of test data in the validation set for that other client. Therefore, migration decisions may not be uniform across different clients.

Migration decisions may include, in some embodiments, decisions to automatically migrate to the updated version, decisions to not migrate to the updated version, and/or decisions to refrain from migrating until some conditions are satisfied (e.g., client request, expiration of time period, etc.). In some embodiments, the migration decisions may be to provide a recommendation of the migration decision (e.g., to a client), as discussed above with regard to FIG. 4. Migration decisions may be based on evaluating client-specified criteria (e.g., for acceptable regression or no regression). In some embodiments, migration decisions may be based on evaluating service provided criteria (e.g., no regression is acceptable).

Services may support multiple different testing modes for clients, including the option to forgo client-specific testing. In this way, clients can tailor migration of machine learning model(s) implemented by a network-based service to suit individual requirements. FIG. 7 is a flowchart showing different testing modes for migrating to a version of a machine learning model, according to some embodiments. As indicated at 710, a testing mode for a client may be identified after creating an updated version for a machine learning model, in some embodiments. If, for example, a client has registered a test data set for validation, then a lookup in a registry for test data sets according to a client identifier (e.g., account identifier) may be performed.

If a test data set is present in the registry, then the testing mode identified for the client may be a client-specified validation mode, as indicated by the corresponding exit from testing mode 720. Similar to the discussion above with regard to FIG. 6, a test data set registered for the client maybe obtained, as indicated at 732 and used to perform a validation test for the client using the test data set and the updated version of the machine learning model, as indicated at 742. A migration decision may be may be made according to the testing mode result, as indicated at 750.

For some clients, a test validation set may be insufficient to provide helpful validation test. Such clients may request or specify shadow testing mode for handling potential migrations to updated versions of machine learning models, in some embodiments. For instance, as indicated by the exit from 720 for clients with shadow mode testing specified, shadow testing using the updated version of the machine learning model may be performed using live traffic for the client received at the network-based service, in some embodiments, as indicated at 746. For instance, results for live traffic (e.g., individual requests) for a current version of the model and the updated version of the model may be compared over a period of time in order to determine a testing mode result. If the results match (or match for an acceptable amount), then it may be determined that the updated version of the machine learning model does not regress for the client. For a below threshold number of different results, however, a determination may be made that a regression has occurred, in some embodiments. A result for the shadow testing mode may also be used to make a migration decision for a client, as indicated at 750. Although not illustrated in FIG. 7, in some embodiments, a client may request multiple testing modes. For example, both shadow testing and client-supplied test data set testing may be performed for a same client.

Some clients may not wish to delay migration to updated versions of models. A testing mode of none may be specified (or may be the default) for clients that do not specify another testing mode. Those clients, as indicated by the "none" exit from 720 may be automatically migrated to the updated version of the machine learning model, as indicated at 744. In some embodiments, a migrated client may revert to an earlier version of the machine learning model after performing validation testing or observing live traffic results (e.g., by including in requests a parameter indicating a prior model version identifier for the machine learning model).

In some embodiments, various performance information (e.g., metric(s)) associated with the performance of the different testing modes may be provided to the client. As described above, the performance information may allow the client to perform other types of analysis concerning an updated version of a model, including determining whether a tradeoff between different kinds of performance improvements indicated by the performance information justifies making a migration.

Figure 8:
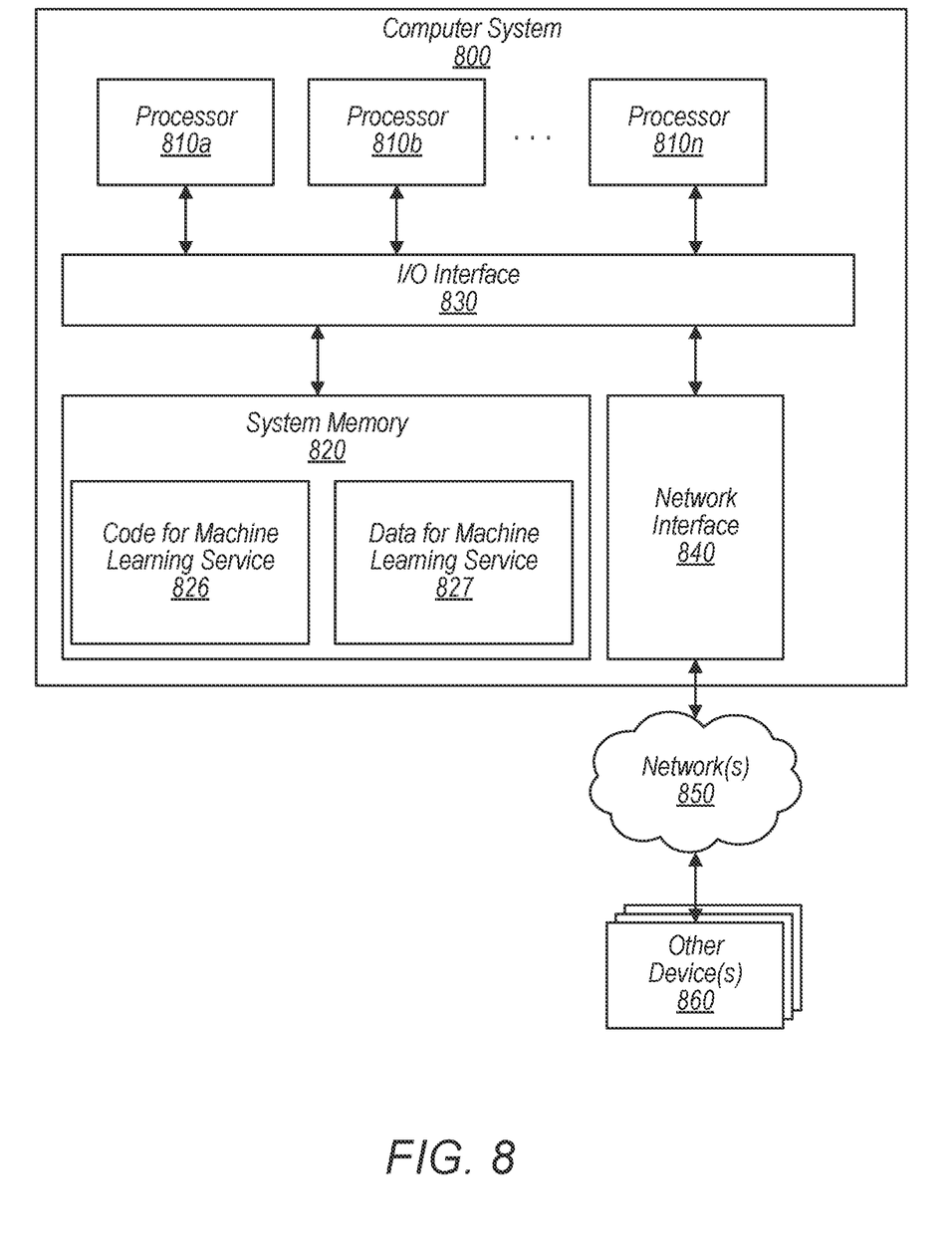
FIG. 8 is a block diagram showing an example computing system to implement the various techniques described herein, according to some embodiments.

FIG. 8 shows an example computing system to implement the various techniques described herein, according to some embodiments. For example, in one embodiment, the machine learning service described above (e.g., machine learning service 105 in FIG. 1) may be implemented by a computer system, for instance, a computer system as in FIG. 8 that includes one or more processors executing program instructions stored on a computer-readable storage medium coupled to the processors. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be one embodiment of a computer-accessible medium configured to store instructions and data accessible by processor(s) 810. In various embodiments, system memory 820 may be implemented using any non-transitory storage media or memory media, such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the illustrated embodiment, program instructions (e.g., code) and data implementing one or more desired functions, e.g., those of the machine learning service described above in FIGS. 1-7, are shown stored within system memory 830 as code 826 and data 827.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data as described above for FIG. 1-7. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more processors; and
a memory storing program instructions that, when executed by the one or more processors, cause the one or more processors to:
receive, via an interface for a network-based service, a request that identifies a test data set for a client that uses a machine learning model hosted by the network-based service, wherein the machine learning model is applied by the network-based service to respective client input data for a plurality of clients including the client;
register the test data set to validate subsequent versions of the machine learning model on behalf of the client at the network-based service;
after creation of an updated version of the machine learning model:
obtain the test data set registered by the client for validation;
perform a validation test of the updated version of the machine learning model using the test data set; and
evaluate a result of the validation test to make a decision regarding whether to migrate the machine learning model to the updated version for the client.

2. The system of claim 1, wherein the evaluation of the result makes the decision to migrate the machine learning model to the updated version and wherein the memory stores further program instructions that cause the one or more processors to automatically migrate the machine learning model to the updated version for the client.

3. The system of claim 1, wherein the evaluation of the result makes the decision to not migrate the machine learning model to the updated version.

4. The system of claim 1, wherein the result of the validation test is provided to the client via the interface.

5. The system of claim 1, wherein another one of the plurality of clients sent a request to the network-based service via the interface that causes the network-based service to automatically migrate to the updated version of the machine learning model for the other client without performing another validation test for the other client.

6. A method, comprising:
receiving, via an interface for a network-based service, respective requests that identify respective test data sets for one or more clients that use a machine learning model hosted by the network-based service, wherein the machine learning model is applied by the network-based service to respective client input data for the one or more clients;
after creating an updated version of the machine learning model:
validating, by the network-based service, the updated version of the machine learning model for individual ones of the one or more clients using the respective test data sets identified by the one or more clients; and
making, by the network-based service, respective decisions regarding whether to migrate the machine learning model to the updated version for individual ones of the one or more clients according to respective results of the validations using the respective test data sets.

7. The method of claim 6, further comprising providing at least one of the respective results of the validations for at least one of the one or more clients to the at least one client.

8. The method of claim 6, wherein one of the respective requests for one of the one more clients that identifies one of the respective test data sets is a request to update the respective test data set for the one client.

9. The method of claim 6, wherein one of the respective decisions made for one of the one or more clients is a decision to migrate the machine learning model to the updated version for the one client, and wherein the method further comprises automatically migrating the machine learning model to the updated version for the one client.

10. The method of claim 9, further comprising:
providing a model version identifier that indicates the updated version of the machine learning model via the interface of the network-based service as part of a response to one or more requests that cause the updated version of the machine learning model to be applied for the one client.

11. The method of claim 9, wherein another one of the respective decisions made for another one of the one or more clients is a decision to not migrate the machine learning model to the updated version for the other client.

12. The method of claim 6, further comprising providing at least one of the respective decisions made for at least one of the one or more clients to the at least one client as a recommendation.

13. The method of claim 12, further comprising:
performing the migration to the updated version of the machine learning model for the at least one client responsive to receiving an indication to perform the migration received from the at least one client.

14. One or more non-transitory, computer readable media, storing program instructions that when executed on or across one or more computing devices, cause the one or more computing devices to implement:
receiving, via an interface for a network-based service, a request that identifies a test data set for a client that uses a machine learning model hosted by the network-based service, wherein the machine learning model is applied by the network-based service to respective client input data for a plurality of clients including the client;

registering the test data set for validating subsequent versions of the machine learning model on behalf of the client at the network-based service;

after creating an updated version of the machine learning model:

validating the updated version of the machine learning model for the client using the test data set registered by the client for validation; and     making a decision regarding whether to migrate the machine learning model to the updated version for the client according to a result of the validation using the test data set.

15. The one or more non-transitory, computer readable media of claim 14, wherein the decision made for the client is a decision to not migrate the machine learning model to the updated version for the client.

16. The one or more non-transitory, computer readable media of claim 14, wherein the request that identifies the test data set for the client further identifies a client-specified validation testing mode for the client, wherein the client also requests a shadow testing mode for the client, and wherein the one or more non-transitory, computer-readable storage media store further program instructions that when executed on or across the one or more computing devices cause the one or more computing devices to further implement comparing results of the updated version of the machine learning model generated for the client with results of a current version of the machine learning model generated for the client to test performance of the updated version of the machine learning model for the client.

17. The one or more non-transitory, computer readable media of claim 14, wherein the decision made for the client is a decision to migrate the machine learning model to the updated version for the client, and wherein the one or more non-transitory, computer-readable storage media store further program instructions that when executed on or across the one or more computing devices cause the one or more computing devices to further implement automatically migrating the machine learning model to the updated version for the client.

18. The one or more non-transitory, computer readable media of claim 14, storing further program instructions that when executed on or across the one or more computing devices cause the one or more computing devices to further implement providing the decision made for the client to the client as a recommendation of a version of the machine learning model to use and wherein the interface for the network-based service supports requests for different versions of the machine learning model from the plurality of clients of the machine learning model.

19. The one or more non-transitory, computer readable media of claim 14, storing further program instructions that when executed on or across the one or more computing devices cause the one or more computing devices to further implement receiving another request from the client that identifies an updated test data set for the client.

20. The one or more non-transitory, computer readable media of claim 14, wherein another one of the plurality of clients sent a request to the network-based service via the interface that causes the network-based service to automatically migrate to the updated version of the machine learning model for the other client without performing another validation test for the other client.

* * * * *